(12) United States Patent
Mace et al.

(10) Patent No.: US 7,406,770 B2
(45) Date of Patent: Aug. 5, 2008

(54) TRIMMER WITH COOPERATING CUTTER BLADES

(76) Inventors: William Bradley Mace, 2813 Tahoe La., Spring Grove, IL (US) 60081; Ronald A. Carlson, 14N591 Timber Ridge Dr., Elgin, IL (US) 60123

( * ) Notice: Subject to any disclaimer, the term of this patent is extended or adjusted under 35 U.S.C. 154(b) by 130 days.

(21) Appl. No.: 11/339,209

(22) Filed: Jan. 25, 2006

(65) Prior Publication Data

US 2007/0169599 A1 Jul. 26, 2007

(51) Int. Cl.
*B26B 19/02* (2006.01)
*B26B 19/04* (2006.01)

(52) U.S. Cl. .............. 30/216; 30/220; 30/223; 30/224; 83/837; 56/236; 411/432; 411/533

(58) Field of Classification Search ............ 83/13, 83/837; 30/210, 220, 216, 218, 224, 223, 30/208; 74/567, 570, 440, 89.16, 594.2, 74/569, 89, 50, 25, 89.42, 409; 56/236, 233, 56/246, 13.6, 17.6, 297; 411/533, 368, 432, 411/388, 366.1, 367
See application file for complete search history.

(56) References Cited

U.S. PATENT DOCUMENTS

| | | | | |
|---|---|---|---|---|
| 236,624 A | * | 1/1881 | Pratt | 411/147 |
| 1,878,425 A | * | 9/1932 | Olson | 411/154 |
| 2,277,080 A | | 3/1942 | Davis | |
| 2,645,850 A | | 7/1953 | Sejman et al. | |
| 2,741,844 A | | 4/1956 | Sejman et al. | |
| 2,787,111 A | * | 4/1957 | Templeton | 56/297 |
| 3,170,237 A | * | 2/1965 | Weidauer | 30/268 |
| 3,200,493 A | * | 8/1965 | Dodegge | 30/216 |
| 3,422,531 A | | 1/1969 | Lill et al. | |
| 4,251,916 A | | 2/1981 | Linden | |
| 4,619,045 A | * | 10/1986 | Mayer | 30/216 |
| 5,075,972 A | * | 12/1991 | Huang | 30/216 |
| 5,082,387 A | * | 1/1992 | DeVries | 403/146 |
| 5,581,891 A | * | 12/1996 | Wheeler et al. | 30/216 |
| 5,984,602 A | * | 11/1999 | Park | 411/154 |
| 6,263,579 B1 | * | 7/2001 | Nagashima | 30/220 |
| 2002/0182031 A1 | * | 12/2002 | Anderson et al. | 411/533 |

* cited by examiner

*Primary Examiner*—Ghassem Alie
(74) *Attorney, Agent, or Firm*—Wood, Phillips, Katz, Clark & Mortimer

(57) ABSTRACT

A trimmer having first and second cutting blades. The first and second cutting blades are mounted so that first and second flat surfaces, respectively thereon, face and are substantially parallel to each other. A drive causes at least one of the first and second cutting blades to move relative to the other of the first and second cutting blades. At least one fastening assembly has first and second facing shoulders between which the first and second cutting blades reside. The at least one fastening assembly further has at least one biasing element that produces a force that biasably urges the first and second flat cutting blade surfaces towards each other.

13 Claims, 5 Drawing Sheets

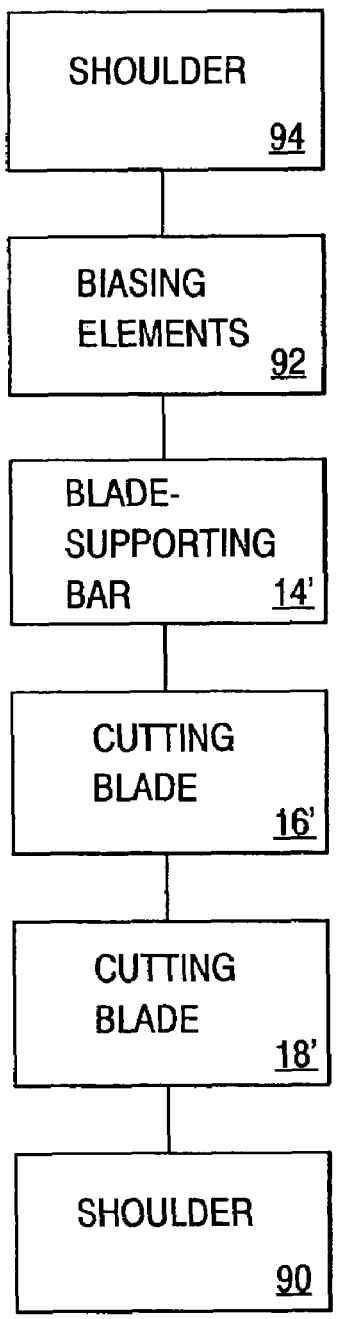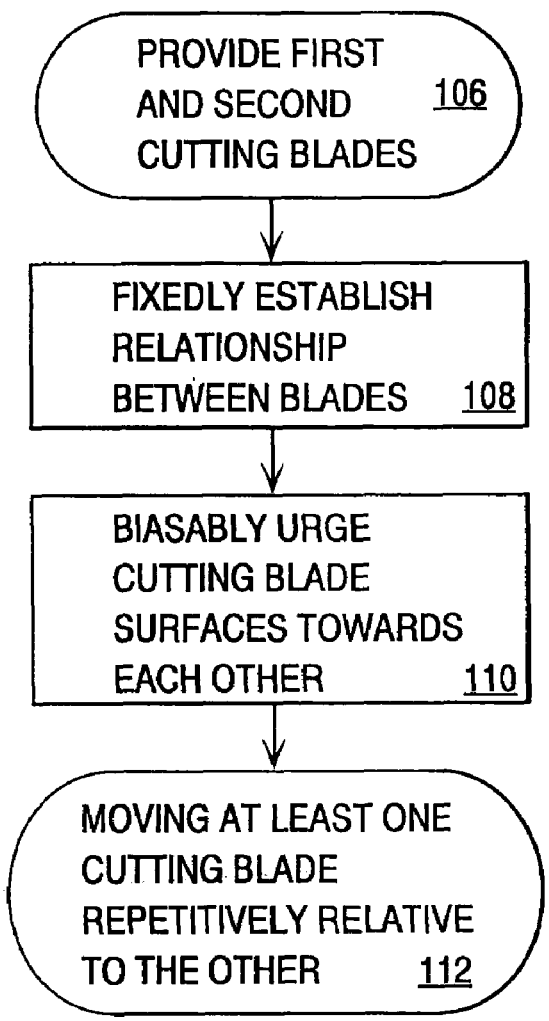

TRIMMER WITH COOPERATING CUTTER BLADES

BACKGROUND OF THE INVENTION

1. Field of the Invention

This invention relates to trimmers, such as those used to sever vegetation and, more particularly, to a trimmer having separate cutting blades with cutting edges that cooperate as relative movement between the cutting blades is effected.

2. Background Art

A well known trimmer construction consists of cooperating cutting blades that are moved, one guidingly against the other, to cause cutting edges on the cutting blades to interact to effect severance of material, such as vegetation. Myriad different designs for these trimmers are currently in existence. In one exemplary form, the separate cutting blades are elongate and have cooperating surfaces that move guidingly, one against the other, to produce a cutting action as the cutting edges thereon are caused to repetitively interact with a scissors-type action. Ideally, the cutting blade surfaces move, one against the other, without excessive binding. Exemplary mechanisms for accomplishing this, and some associated drawbacks, will now be described.

In one design, the cutting blades are operatively connected to a support bar on a frame associated with a drive mechanism, that could be an internal combustion engine, or an electrically operated motor. A number of bolts are directed through the cutting blades and are threadably connected to the support bar so that the blades become captive between the support bar and the heads of the bolts. The bolts are tightened and thereafter backed off ¼ to ½ turn to allow sufficient clearance between the blades that they can be guided, one against the other, without significant resistance.

This mechanism has an advantage that it allows the spacing between the blades to be changed after there has been wear thereon that increases the clearance to beyond what is optimal. As the clearance increases beyond a certain amount, the cutting effectiveness may diminish. The blades may at some point be prone to jamming as when material wedges between the cooperating surfaces.

The drawback with this system is that the adjustment may be made by the end user in the field. Some users may find the adjustment process difficult or confusing, whereas others may not wish to take the time necessary to adjust the bolts.

In an alternative design, a rigid spacer may be fixed between a support bar and the bottom cutting blade. A bolt is tightened until the relationship between the support bar and bottom blade is fixed. This space is not adjustable and therefor is fixed as dictated by the configuration of the spacer.

Over time, as noted above, the repetitive rubbing action of the blades, one against the other, may cause wear that increases the spacing between the cooperating cutting blade surfaces. Eventually, the clearance between the blade surfaces may be such that the blades are detrimentally movable away from each other to the point that the cutting blades will not effectively sever the material for which they are designed or become jammed by material that is being cut.

The industry continues to seek improved designs of this type of mechanism wherein the cooperating cutting blade surfaces may be consistently maintained in relationship to each other and a support bar so that optimal cutting occurs, even after there has been normal anticipated wear of the cutting blades after extended use.

SUMMARY OF THE INVENTION

In one form, the invention is directed to a trimmer having first and second cutting blades. The first cutting blade has a generally flat first surface residing in a first plane and a first cutting edge. The second cutting blade has a generally flat second surface residing in a second plane and a second cutting edge. The first and second cutting blades are mounted so that the first and second flat surfaces face and are substantially parallel to each other. A drive causes at least one of the first and second cutting blades to move relative to the other of the first and second cutting blades to thereby produce a repetitive cutting action between the first and second cutting edges. At least one fastening assembly has first and second facing shoulders between which the first and second cutting blades reside. The first and second facing shoulders are spaced from each other a predetermined distance that at least one of: a) maintains the first and second flat cutting blade surfaces against each other; and b) establishes a maximum spacing between the first and second flat cutting blade surfaces. The at least one fastening assembly further has at least one biasing element that produces a force that biasably urges the first and second flat cutting blade surfaces towards each other.

In one form, the first and second cutting blades are each elongate with a length and the at least one of the first and second cutting blade moves in a reciprocating linear path substantially parallel to the lengths of the first and second cutting blades and first and second planes.

In one form, the at least one fastening assembly has a cylindrical spacer with a central axis and a body that extends through the first and second cutting blades so as to guide movement of the at least one of the first and second cutting blades relative to the other of the first and second cutting blades. The cylindrical spacer has a surface facing axially relative to the central axis and defines one of the first and second facing shoulders.

In one form, the at least one fastening assembly further has a bolt with a head and a nut that is threaded to the bolt. One of the bolt head and nut has a surface facing axially relative to the central axis and defines the other of the first and second shoulders.

In one form, the at least one fastening assembly further has a third shoulder facing axially relative to the central axis. The at least one biasing element acts between the third shoulder and the first cutting blade, either directly or indirectly upon the first cutting blade, to biasably urge the first flat surface towards the second flat surface.

In one form, the at least one biasing element is in the form of at least one wave washer.

The at least one biasing element may surround the cylindrical spacer.

In one form, the cylindrical spacer is captive fixedly between the bolt head and nut.

In one form, the bolt and nut can be relatively repositioned to change the predetermined distance by which the first and second facing shoulders are spaced.

In one form, a cup washer is provided on the bolt and extends around at least a part of the at least one biasing element to shield the at least one biasing element against contact by foreign matter during operation of the trimmer.

In one form, there are a plurality of cutting edges on each of the first and second cutting blades that cooperate to produce a repetitive cutting action.

In one form, there are a plurality of fastening assemblies spaced along the lengths of the first and second cutting blades.

The trimmer may further include a blade-supporting bar overlying one of the first and second cutting blades and through which the fastening assemblies extend.

A washer may be captive between the cylindrical spacer and one of the bolt head and nut and defines the third shoulder.

The trimmer may further include a frame upon which the drive is mounted, with the blade-supporting bar fixed relative to the frame.

The frame may include at least one graspable handle, with the trimmer constructed so that a user can grasp the at least one graspable handle and lift and selectively reposition the trimmer to effect cutting of material through the cutting edges.

The invention is further directed to a method of cutting a material while maintaining cooperating cutting blades on a trimmer in a desired relationship. The method includes the steps of: providing a first cutting blade having a generally flat first surface and a first cutting edge; providing a second cutting blade having a generally flat second surface and a second cutting edge; fixedly establishing a relationship between the first and second cutting blades so that either a) the first and second flat surfaces are against each other or b) the first and second flat surfaces are prevented from moving away from each other beyond a predetermined distance; causing at least one of the first and second cutting blades to move relative to the other of the first and second cutting blades to thereby produce a repetitive cutting action between the first and second cutting edges on a material being cut; and causing the first and second cutting blade surfaces to at all times be biasably urged towards each other.

In one form, the step of fixedly establishing a relationship involves providing at least one fastening assembly with facing first and second shoulders spaced a predetermined distance and between which the first and second cutting blades are captively maintained.

The step of providing at least one fastening assembly may involve providing a bolt with a head, a nut that is threaded to the bolt, and a cylindrical spacer that is captive between the bolt head and nut.

The step of providing a cylindrical spacer may involve providing a cylindrical spacer with a body that extends through the first and second cutting blades and has a central axis. The cylindrical spacer has a surface facing axially relative to the central axis and defining one of the first and second facing shoulders.

The method may further include the steps of providing a frame upon which the first and second cutting blades are provided, and grasping the frame and lifting and repositioning the trimmer through the frame to effect cutting of vegetation.

BRIEF DESCRIPTION OF THE DRAWINGS

FIG. 7 is a schematic representation of a generic form of fastening assembly, according to the invention, in relationship to a blade-supporting bar and cutting blades;

FIG. 10 is a flow diagram representation of a method of cutting a material while maintaining cooperating cutting blade on a trimmer in a desired relationship.

DETAILED DESCRIPTION OF THE DRAWINGS

Figure 1:
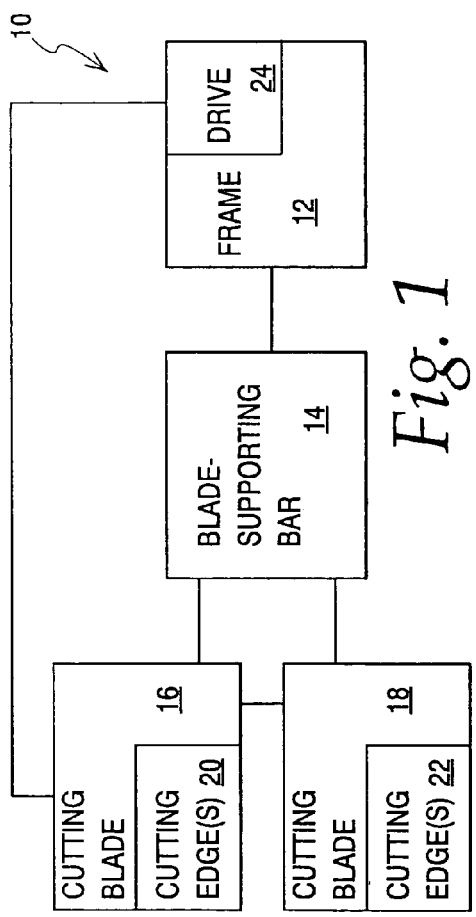
FIG. 1 is a schematic representation of one form of trimmer, according to the present invention.

Referring initially to FIG. 1, a trimmer, according to the present invention, is shown at 10 in schematic form. The trimmer 10 consists of a frame 12 to which a blade-supporting bar 14 is attached. Cutting blades 16, 18 are mounted to the blade supporting bar 14. The cutting blade 16 has at least one cutting edge 20, with the cutting blade 18 having a like cutting edge or edges 22. The cutting blades 16, 18 and associated cutting edges 20, 22 are configured so that as the cutting edges 20, 22 move repeatedly past each other, a cutting action occurs. In this particular embodiment, a drive 24 is provided for the cutting blade 16, which is moved relative to the cutting blade 18 to produce the aforementioned cutting action. The drive 24 may be operated using fuel, such as an internal combustion engine, or electrically operated, such as through a battery, or from an electrical power source.

Figure 2:
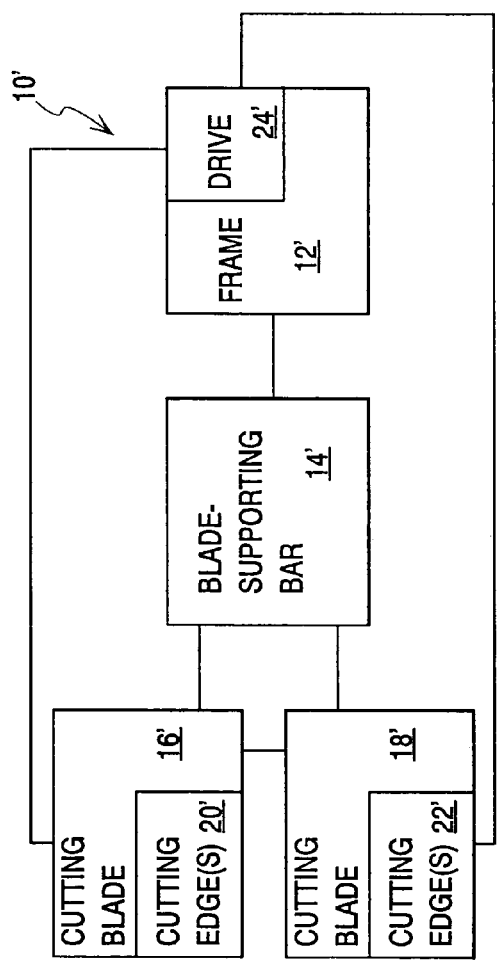
FIG. 2 is a view as in FIG. 1 of a modified form of trimmer, according to the invention.

In FIG. 2, a modified form of trimmer is shown at 10', with a frame 12' and a blade supporting bar 14'. In this embodiment, cutting blades 16', 18', with cutting edges 20', 22', are mounted on the blade supporting bar 14' so that each of the cutting blades 16', 18' is moved by a drive 24' relative to each other and the blade supporting bar 14'.

The precise construction of the frames 12, 12' and drives 24, 24' is not critical to the present invention. The invention contemplates virtually any type of frame structure and associated drive which can cause relative movement between two cutting blades, regardless of the path taken by the movable cutting blade(s), i.e. curved, straight, etc.

Figure 3:
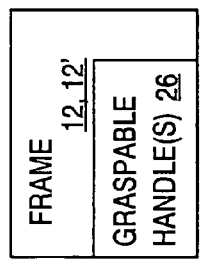
FIG. 3 is a schematic representation of a frame associated with the trimmers in FIGS. 1 and 2 and having at least one graspable handle to facilitate control thereof.

Further, while the inventive concepts can be used on a non-portable trimmer, as shown in FIG. 3, one preferred form of the trimmer is a hand holdable unit with one or more graspable handles 26 upon the frame 12, 12'. Through the handle(s) 26, the frame 12, 12' and associated cutting blades 16, 16', 18, 18' can be lifted and repositioned conveniently during a cutting operation, as upon vegetation, such as hedges, and the like.

Figure 4:
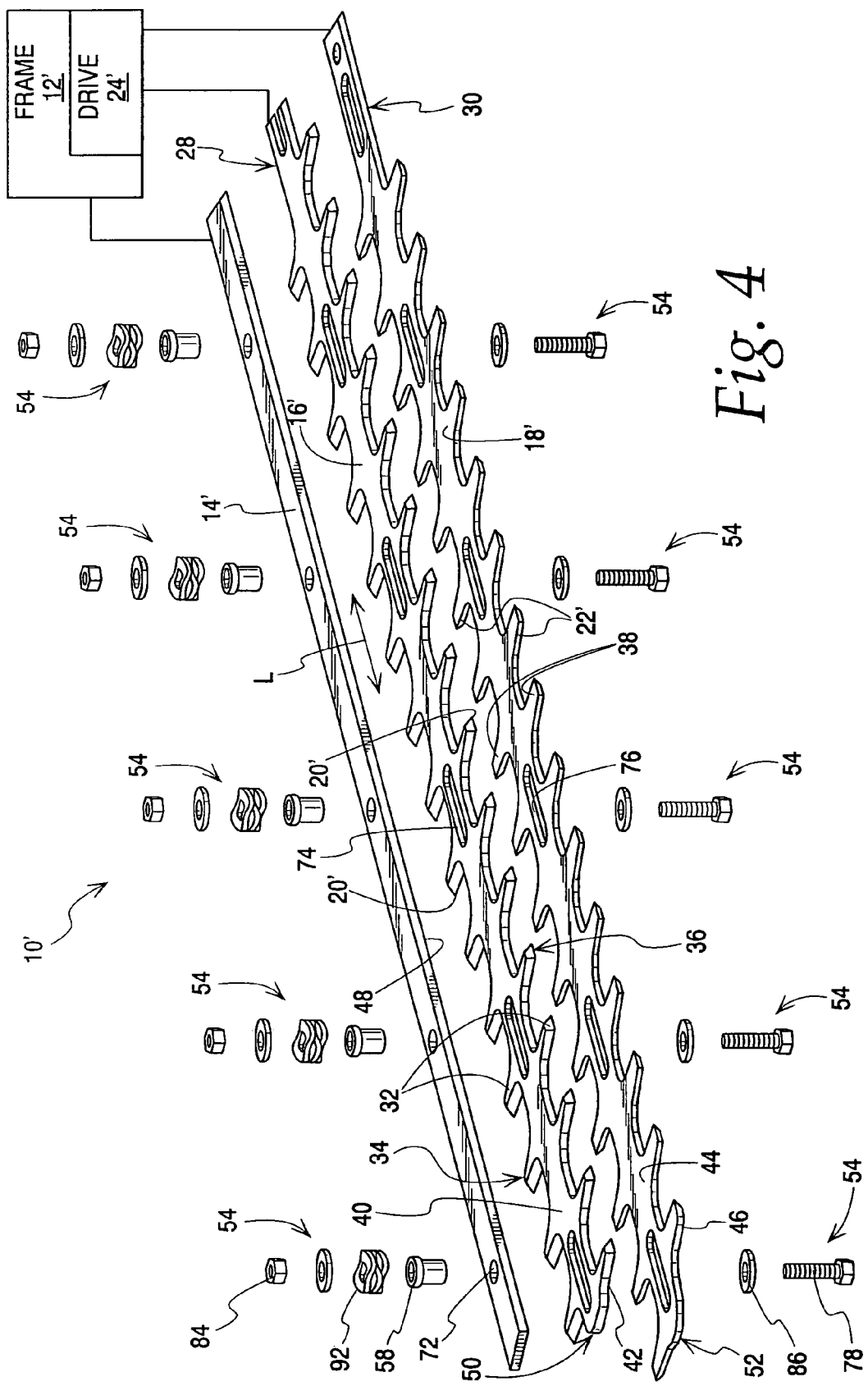
FIG. 4 is a partially schematic, exploded, perspective view of a pair of cutting blades and a blade-supporting bar maintained in operative relationship by a plurality of fastening assemblies, according to the present invention.
Figure 5:
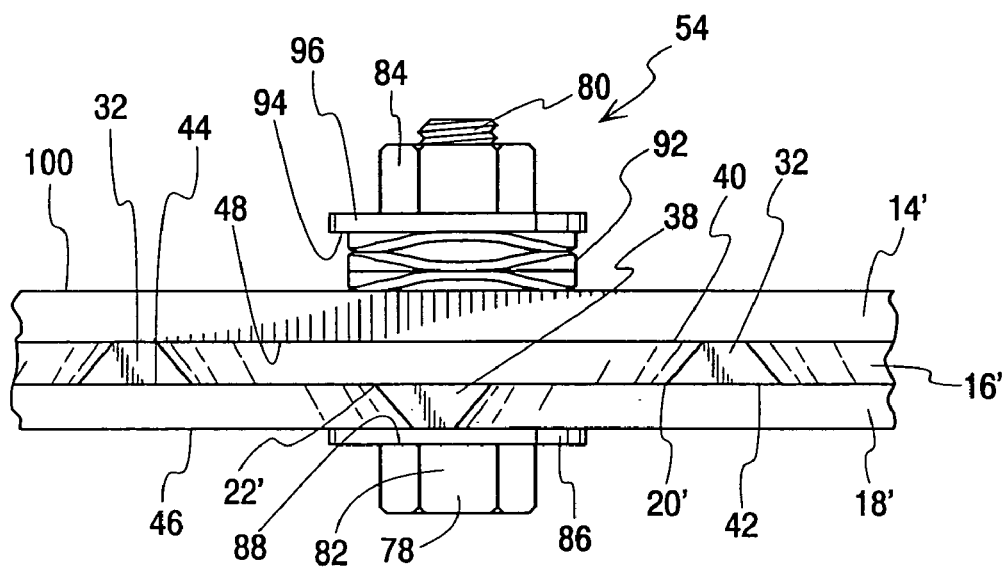
FIG. 5 is an enlarged, fragmentary, side elevation view of one of the fastening assemblies in relationship to the blade-supporting bar and cutting blades.

Details of one exemplary embodiment will now be described with respect to FIGS. 4-6, for the representative trimmer 10'. The trimmer 10', as noted above, consists of a frame 12', drive 24', blade supporting bar 14', and cutting blades 16', 18'. As noted previously, the details of the drive 24', which effects movement of both of the cutting blades 16', 18' for this trimmer style, is not critical to the present invention. One exemplary mechanism for accomplishing this is shown in U.S. Pat. No. 6,263,579, to Nagashima, which is incorporated herein by reference.

The cutting blade 16' has an elongate shape with a length extending in the direction of the double-headed arrow L. The proximal end 28 of the cutting blade 16' is connected to the drive 24'. The cutting blade 18' has a corresponding elongate shape with a length extending in the direction of the double-headed arrow L and a proximal end 30 operatively connected to the drive 24'.

The cutting blade 16' has a scalloped perimeter defining regularly spaced teeth 32 projecting oppositely from the longitudinally extending sides 34, 36. The cutting edges 20' are formed on the teeth 32. The cutting blade 18' has a like arrangement of teeth 38 on which the cutting edges 22' are formed.

The cutting blades 16', 18' are formed from flat stock, whereby the cutting blade 16' has oppositely facing flat surfaces 40, 42 and the cutting blade 18' has oppositely facing flat surfaces 44, 46. The cutting blades 16', 18' are operatively connecting by placing the flat surfaces 42, 44 facially against each other. The opposite flat surface 40 of the cutting blade 16' is placed facially against a flat surface 48 on the blade-supporting bar 14'.

Between the proximal ends 28, 30 of the cutting blades 16', 18', and their distal ends 50, 52, a series of regularly spaced fastening assemblies at 54 are provided. The fastening assemblies 54 each interact with the blade-supporting bar 14' and cutting blades 16', 18' in the same manner.

Each fastening assembly 54 consists of a cylindrical spacer 58 having a central axis 60. The spacer 58 has a throughbore 62 and a stepped outer surface 64 with a larger diameter portion 66 and a smaller diameter portion 68. At the transition between the larger and smaller diameter portions 66, 68, an axially facing, annular shoulder 70 is defined. The axial extent of the smaller diameter portion 68 is slightly greater than the combined thickness T of the blade-supporting bar 14' and the cutting blades 16', 18'.

The spacer 58 is translated through a bore 72 through the blade-supporting bar 14, which bore 72 closely receives the smaller diameter portion 68 of the spacer 58. The spacer 58 extends through elongate slots 74, 76 on the cutting blades 16', 18', respectively, which slots 74, 76 are at all times in registration sufficiently to accommodate the smaller diameter portion 68 of the spacer 58. As is conventional, the slots 74, 76 are dimensioned to accommodate the full range of relative lengthwise movement that occurs between the cutting blades 16', 18' as caused by the drive 24'.

With the spacer 58 in place, a bolt 78 is directed through the through bore 62 so that a threaded end 80, opposite a head 82, is exposed to threadably receive a nut 84. The bolt 78 and nut 94 together define a bolt assembly. In this embodiment, a flat washer 86 is placed against an axially facing shoulder 88 on the head 82. By tightening the bolt 78 and nut 84, a predetermined spacing S is established between the shoulder 70 on the spacer 58 and an annular shoulder 90 defined by the flat washer 86. The spacing S is chosen to be slightly greater than the combined thickness of the blade-supporting bar 14' and cutting blades 16', 18', as identified by "T" in FIG. 6. This maintains the cutting blade surfaces 42, 44 in abutting relationship or in close proximity, and this same relationship between the cutting blade surface 40 and flat surface 48 on the blade-supporting bar 14'. Sufficient clearance is provided so that the cutting blades 16', 18' are allowed to slide guidingly against and relative to each other and the blade-supporting bar 14' in operation. By establishing this fixed dimension S, the cutting blades 16', 18' are prevented from moving away from each other beyond a predetermined amount as might otherwise create a jamming condition or compromise the cutting performance of the cutting blades 16', 18'.

In this embodiment, the elongate cutting blades 16', 18' are each moved in a reciprocating path generally parallel to their lengths and the planes within which the cutting blade surfaces 42, 44 reside.

It is anticipated that over an extended period of time, the interacting surfaces 40, 48; 42, 44 may cause wear on each other which effectively reduces the combined thickness T between the shoulders 70, 90. To accommodate this wear, at least one biasing element 92 is incorporated. A single biasing element 92 is shown in FIGS. 4-6 as a wave washer that surrounds the larger diameter portion 66 of the spacer 58. The wave washer 92 is captive between an axially facing shoulder 94, defined by a flat washer 96 between the nut 84 and spacer end 98, and a surface 100 on the blade-supporting bar 14' facing oppositely to the surface 48. The biasing element 92 is selected so that with the bolt 78 and nut 84 tightened, a force is produced, generally along the axis 60, that biasably urges the blade-supporting bar and cutting blade 16', 18' against each other with a force applied around the axis of the bolt, that is coincident with the axis 60, whereby the flat cutting blade surfaces 42, 44, with the cutting edges 20', 22' thereon, are biasably urged towards each other.

With all of the fastening assemblies 54 secured, at each fastening assembly location, the blade-supporting bar 14' and cutting blades 16', 18' are confined within the dimension S and are each biasably urged, slidingly, axially along the smaller diameter portion 68 of the spacer 58 into abutting, stacked relationship by the wave washers 92. As any of the surfaces 40, 42, 44, 48 wears, a tendency of the blade-supporting bar 14' and cutting blades 16', 18' to separate from each other along the axis 60 is resisted by a force produced by the wave washers 92.

The above-described structure is exemplary in nature only. The invention contemplates many variations from the specific structure disclosed herein. For example, while the biasing element 92 is shown to be a single wave washer, the invention contemplates any single biasing element, or combination of biasing elements 92, as shown in FIG. 7, capable of producing a biasing force upon the blade-supporting bar 14' and cutting blades 16', 18', between the shoulders 90, 94.

Figure 6:
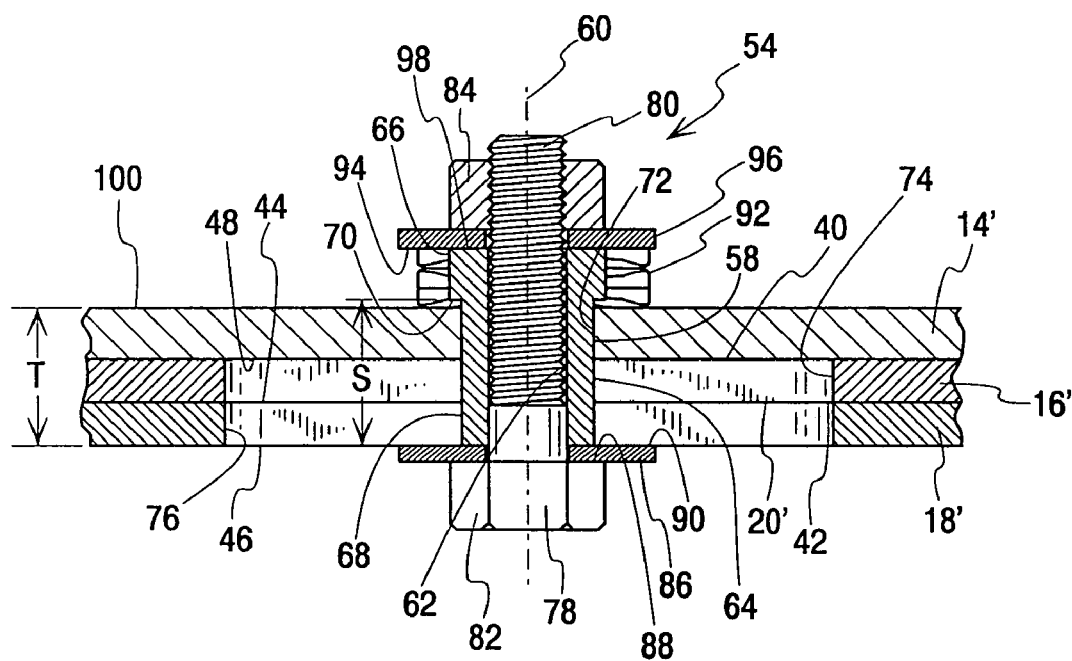
FIG. 6 is a lengthwise cross-sectional view of the fastening assembly, cutting blades, and blade-supporting bar in FIG. 5.

The fastening assemblies 54 may also be constructed so that the predetermined spacing S in FIG. 6 may be variably fixed. In the embodiment shown, by changing the degree of tightening of the bolt 78 and nut 84, this inherently is possible. It is, however, contemplated that the components could be constructed so that the bolt 78 and nut 84 are capable of being tightened to a single predetermined state, wherein the spacing S is not changeable by an end user. This avoids the requirement for judgment on the part of the installer or end user in the event that the structure is for any reason disasembled or adjusted.

The direction of installation of the bolt 78 and spacer 58 does not have to be as shown in the drawings. For example, the spacer 58 might be directed from the bottom up in FIG. 6, with the bolt in the same configuration shown in that figure. Alternatively, the bolt assembly can be reversed in a manner whereby the bolt 78 in FIG. 6 may be installed from top to bottom with the spacer 58 having the same arrangement shown in FIG. 6, or axially reversed.

As a further variation, the washers 86, 96 need not be separate elements. The washer 86 might be altogether eliminated, whereby the shoulder 88 defined by the bolt head 82 performs the function of the washer shoulder 90. Alternatively, the head 82 may be made with an enlarged flange that produces the same shape as the combined, but separate, head 82 and washer 86.

Similarly, the nut 84 can be radially dimensioned to obviate the need for the washer 96, or may be formed with an integral flange to have the same shape as the combined nut 84 and washer 96 shown. For purposes of simplification herein, it should be understood that when it is described that a component defines a shoulder, that component may directly define the acting shoulder or provide a bearing surface for one or more components that define the acting shoulder.

As also noted, the more generic showing of the invention in FIGS. 1-3 contemplates different relative movement between cutting blades and a blade-supporting bar associated therewith. The arrangement in FIG. 4, wherein the cutting blades 16', 18' move parallel to the planes of the flat surfaces 42, 44 in a lengthwise reciprocating path, identified by the double-headed arrow L, is but representative of one construction, which is common for trimmers used on vegetation, such as hedges.

As a further variation, although one that is not preferred, the spacer 58 could be fixed with respect to the blade-supporting bar 14', with a biasing force produced directly upon the blades 16', 18'. The biasing elements would generally be more prone to wear with this construction.

Figure 8:
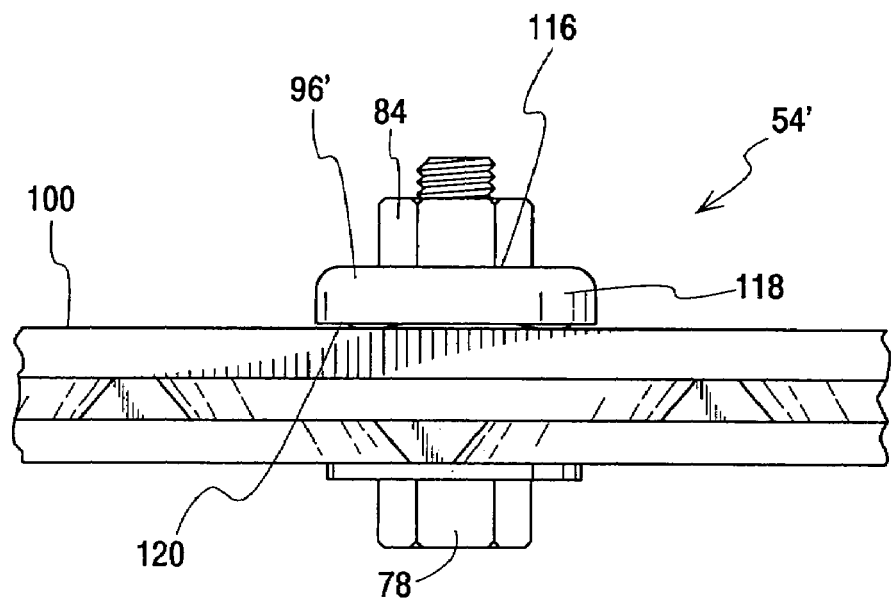
FIG. 8 is a view as in FIG. 5 and showing a modified form of fastening assembly wherein a flat washer in the FIG. 5 form of the fastening assembly is replaced by a cup washer.
Figure 9:
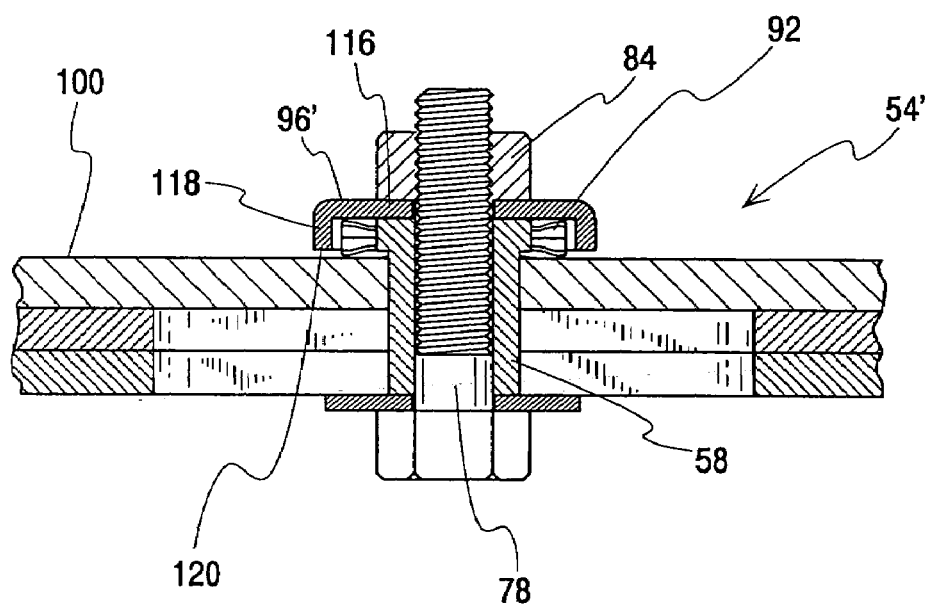
FIG. 9 is a lengthwise cross-sectional view of the fastening assembly, cutting blades, and blade-supporting bar in FIG. 8.

One variation of the inventive fastening assembly is shown at 54' in FIGS. 8 and 9. On the fastening assembly 54', a cup washer 96' is used in place of the flat washer 96 on the fastening assembly 54. The remaining components of the fastening assembly 54' correspond to those in the fastening assembly 54, to include the bolt 78, nut 84, cylindrical spacer 58, and biasing element(s) 92.

The cup washer 96' has a flat body 116 that performs the functions of the aforementioned flat washer 96. In addition, the cup washer 96' has a peripheral flange 118 that extends around the biasing element(s) 92 to thereby shield the same against contact by foreign matter during operation of the trimmer 10. The bottom edge 120 of the flange 118 may be spaced slightly from the blade surface 100 to permit a modicum of adjustment, as hereinabove described.

It is actually preferred that the cup washer 96' be used in place of the flat washer 96, and particularly when the biasing element(s) 92 is in the form of one or more wave washers. In the absence of shielding, that is afforded by the cup washer 96', portions of foliage being trimmed may become wedged into the biasing element(s) 92. This may either inflict damage upon the biasing element(s) 92 or restrict movement thereof as could impair the ability of the biasing element(s) 92 to perform the function intended therefor.

With the inventive structure, a method of cutting a material while maintaining blades on a trimmer in desired relationship can be carried out as shown in flow diagram form in FIG. 10. More particularly, as shown at block 106, first and second cutting blades having flat surfaces with cutting edges are provided. As shown at block 108, a relationship between the first and cutting blades is fixedly established so that either a) the first and second flat surfaces are against each other or b) the first and second flat surfaces are prevented from moving away from each other beyond a predetermined distance. As shown at block 110, the first and second cutting blade surfaces are caused at all times to be biasably urged towards each other. As shown at block 112, at least one cutting blade is repetitively moved relative to the other to effect cutting of the material, such as vegetation.

The foregoing disclosure of specific embodiments is intended to be illustrative of the broad concepts comprehended by the invention.

The invention claimed is:

1. A trimmer comprising:
a first cutting blade having a generally flat first surface residing in a first plane and a first cutting edge;
a second cutting blade having a generally flat second surface residing in a second plane and a second cutting edge,
the first and second cutting blades mounted so that the first and second flat surfaces face and are substantially parallel to each other;
a drive that causes at least one of the first and second cutting blades to move relative to the other of the first and second cutting blades to thereby produce a repetitive cutting action between the first and second cutting edges; and
at least one fastening assembly comprising first and second facing shoulders between which the first and second cutting blades reside,
the first and second facing shoulders spaced from each other a predetermined distance that at least one of: a) maintains the first and second flat cutting blade surfaces against each other; and b) establishes a maximum spacing between the first and second flat cutting blade surfaces,
the at least one fastening assembly further comprising at least one biasing element that produces a force that biasably urges the first and second flat cutting blade surface towards each other,
wherein the at least one fastening assembly comprises a cylindrical spacer with a central axis and having a body that extends through the first and second cutting blades so as to guide movement of the at least one of the first and second cutting blades relative to the other of the first and second cutting blades,
the cylindrical spacer having a surface facing axially relative to the central axis and defining one of the first and second facing shoulders,
wherein the at least one fastening assembly further comprises a bolt assembly comprising a bolt and a nut that is threaded to the bolt, the bolt having a head and an axis, the bolt assembly having a surface facing axially relative to the central axis and defining the other of the first and second shoulders,
wherein the at least one fastening assembly further comprises a third shoulder facing axially relative to the central axis and the at least one biasing element is in the form of an element that extends around the bolt axis and acts between the third shoulder and the first cutting blade, either directly or indirectly upon the first cutting blade, to biasably urge the first flat surface towards the second flat surface with a force applied around the bolt axis.

2. The trimmer according to claim 1 wherein the first and second cutting blades are each elongate with a length and the at least one of the first and second cutting blades moves in a reciprocating linear path substantially parallel to the lengths of the first and second cutting blades and first and second planes.

3. The trimmer according to claim 1 wherein the at least one biasing element comprises at least one wave washer.

4. The trimmer according to claim 1 wherein the at least one biasing element surrounds the cylindrical spacer.

5. The trimmer according to claim 1 wherein the cylindrical spacer is captive fixedly between the bolt head and nut.

6. The trimmer according to claim 1 wherein a cup washer is provided on the bolt, the cup washer extending around at least a part of the at least one biasing element to shield the at least one biasing element against contact by foreign matter during operation of the trimmer.

7. The trimmer according to claim 1 wherein there are a plurality of cutting edges on each of the first and second cutting blades that cooperate to produce a repetitive cutting action.

8. The trimmer according to claim 1 wherein there are a plurality of said fastening assemblies spaced along the lengths of the first and second cutting blades.

9. The trimmer according to claim 8 wherein the trimmer further comprises a blade-supporting bar overlying one of the first and second cutting blades and through which the fastening assemblies extend.

10. The trimmer according to claim 5 wherein a washer is captive between the cylindrical spacer and one of the bolt head and nut and defines the third shoulder.

11. The trimmer according to claim 9 wherein the trimmer further comprises a frame upon which the drive is mounted and the blade-supporting bar is fixed relative to the frame.

12. The trimmer according to claim 9 wherein the trimmer further comprises a frame with at least one graspable handle and the trimmer is constructed so that a user can grasp the at least one graspable handle and lift and selectively reposition the trimmer to effect cutting of material through the cutting edges.

13. A trimmer comprising:
   a first cutting blade having a generally flat first surface residing in a first plane and a first cutting edge;
   a second cutting blade having a generally flat second surface residing in a second plane and a second cutting edge,
   the first and second cutting blades mounted so that the first and second flat surfaces face and are substantially parallel to each other;
   a drive that causes at least one of the first and second cutting blades to move relative to the other of the first and second cutting blades to thereby produce a repetitive cutting action between the first and second cutting edges; and
   at least one fastening assembly comprising first and second facing shoulders between which the first and second cutting blades reside,
   the first and second facing shoulders spaced from each other a predetermined distance that at least one of: a) maintains the first and second flat cutting blade surfaces against each other; and b) establishes a maximum spacing between the first and second flat cutting blade surfaces,
   the at least one fastening assembly further comprising at least one biasing element that produces a force that biasably urges the first and second flat cutting blade surface towards each other,
   wherein the at least one fastening assembly comprises a cylindrical spacer with a central axis and having a body that extends through the first and second cutting blades so as to guide movement of the at least one of the first and second cutting blades relative to the other of the first and second cutting blades,
   the cylindrical soacer having a surface facing axially relative to the central axis and defining one of the first and second facing shoulders,
   wherein the at least one fastening assembly further comprises a bolt assembly comprising a bolt and a nut that is threaded to the bolt, the bolt having a head, the bolt assembly having a surface facing axially relative to the central axis and defining the other of the first and second shoulders,
   wherein the at least one fastening assembly further comprises a third shoulder facing axially relative to the central axis and the at least one biasing element acts between the third shoulder and the first cutting blade, either directly or indirectly upon the first cutting blade, to biasably urge the first flat surface towards the second flat surface,
   wherein the bolt and nut can be relatively repositioned to change the predetermined distance by which the first and second facing shoulders are spaced.

* * * * *

UNITED STATES PATENT AND TRADEMARK OFFICE
CERTIFICATE OF CORRECTION

| | | |
|---|---|---|
| PATENT NO. | : 7,406,770 B2 | Page 1 of 1 |
| APPLICATION NO. | : 11/339209 | |
| DATED | : August 5, 2008 | |
| INVENTOR(S) | : Mace et al. | |

It is certified that error appears in the above-identified patent and that said Letters Patent is hereby corrected as shown below:

Claim 9 - Col. 10, line 17 – "soacer" should be --spacer--

Signed and Sealed this

Fourth Day of November, 2008

JON W. DUDAS
*Director of the United States Patent and Trademark Office*